United States Patent
Stewart et al.

(10) Patent No.: US 6,195,971 B1
(45) Date of Patent: Mar. 6, 2001

(54) GRASS COLLECTOR ARRANGEMENT FOR A REAR DISCHARGE MOWER

(75) Inventors: Lawrence W. Stewart; Stephen J. Vos, both of Jackson; Laramie W. Mixon, Lexington; Dennis A. Alexander, Trenton; Robert R. Boyd, Jackson, all of TN (US)

(73) Assignee: Murray, Inc., Brentwood, TN (US)

( * ) Notice: Subject to any disclaimer, the term of this patent is extended or adjusted under 35 U.S.C. 154(b) by 0 days.

(21) Appl. No.: 09/161,951

(22) Filed: Sep. 29, 1998

Related U.S. Application Data

(63) Continuation-in-part of application No. 09/137,835, filed on Aug. 21, 1998, now abandoned.
(60) Provisional application No. 60/056,827, filed on Aug. 22, 1997.

(51) Int. Cl.[7] .................................................. A01D 43/06
(52) U.S. Cl. .............................................. 56/202; 56/16.6
(58) Field of Search ............................ 56/166, 202, 203, 56/13.4, 320.2, 16.2

(56) References Cited

U.S. PATENT DOCUMENTS

| | | | |
|---|---|---|---|
| 3,757,503 | 9/1973 | Soldavini | 56/202 |
| 3,872,656 | 3/1975 | Dahl | 56/202 |
| 4,149,362 | 4/1979 | Haffner et al. | 56/202 |
| 4,149,363 | 4/1979 | Woelffer et al. | 56/202 |
| 4,214,424 | 7/1980 | Gobin | 56/202 |
| 4,532,756 | 8/1985 | Merkel | 56/202 |
| 4,637,203 | 1/1987 | Fedeli | 56/202 |
| 4,897,988 | 2/1990 | Schweitz et al. | 56/202 |
| 4,903,467 | 2/1990 | Wolf | 56/16.6 |
| 4,907,403 | 3/1990 | Jones | 56/202 |
| 5,517,811 | 5/1996 | Schaedler et al. | 56/202 |

Primary Examiner—Robert E. Pezzuto
Assistant Examiner—Nathan Mammen
(74) Attorney, Agent, or Firm—Pillsbury Madison & Sutro LLP

(57) ABSTRACT

A grass collector for receiving clippings discharged from a port at the rear of a mower housing. The collector is secured to a frame member which is pivotally connected to support members joined to the mower so as to be able to swing between a closed, clippings-receiving position adjacent the rear discharge port and an open, displaced position at which clippings can be dumped from the collector. The position of the collector is selectively controlled by the operator of the mower, and a spring arrangement is provided for retaining the collector in the selected position until over-ridden by the operator.

15 Claims, 5 Drawing Sheets

BAG CLOSED

SPRING IN GREATEST TENSION

BAG OPEN

GRASS COLLECTOR ARRANGEMENT FOR A REAR DISCHARGE MOWER

This is a continuation-in-part of application Ser. No. 09/137,835, filed on Aug. 21, 1998, now abandoned, which was based on Provisional Application No. 60/056,827, filed on Aug. 22, 1997.

BACKGROUND OF THE INVENTION

1. Field of the Invention

The present invention relates to an arrangement for collecting grass clippings from a rear discharge mower. More particularly, the invention is concerned with a grass collector which can be quickly attached to the mower and which is capable of being emptied without disengaging the bag from the mower.

2. Prior Art

There presently are known various attachment arrangements whereby a collector for grass clippings is mounted to a rear discharge mower for receiving the clippings as they exit the mower's housing. Such arrangements include bags suspended from the mower's handle which have an open end secured to cover the rear discharge port of the mower. Others are collector arrangements which are secured to the exterior of the mower's housing adjacent the rear discharge port. A characteristic of such known grass collector arrangements is that when being emptied, it usually is cumbersome to disengage the collector from its clipping-receiving position, empty the collector and then re-secure it in operative position.

SUMMARY OF THE INVENTION

The present invention provides an improved, simplified arrangement for securing a grass collector to a rear discharge mower which permits the collector to be easily emptied and then restored to operative position. More particularly, the mower is provided with rearwardly and upwardly extending members for supporting a frame member to which the collector is attached. The frame ember is pivotally movable relative to the supporting members so as to be able to swing between a closed, clippings-receiving position adjacent the rear discharge port of the mower and an open, displaced position at which clippings are dumped from the collector. A handle is provided whereby the operator can move the collector to the desired position, and a spring retains the collector's position until it is over-ridden by the operator.

BRIEF DESCRIPTION OF THE DRAWINGS

The invention will be described in greater detail with respect to the accompanying drawings wherein.

DETAILED DESCRIPTION OF PREFERRED EMBODIMENTS OF THE INVENTION

Figure 1:
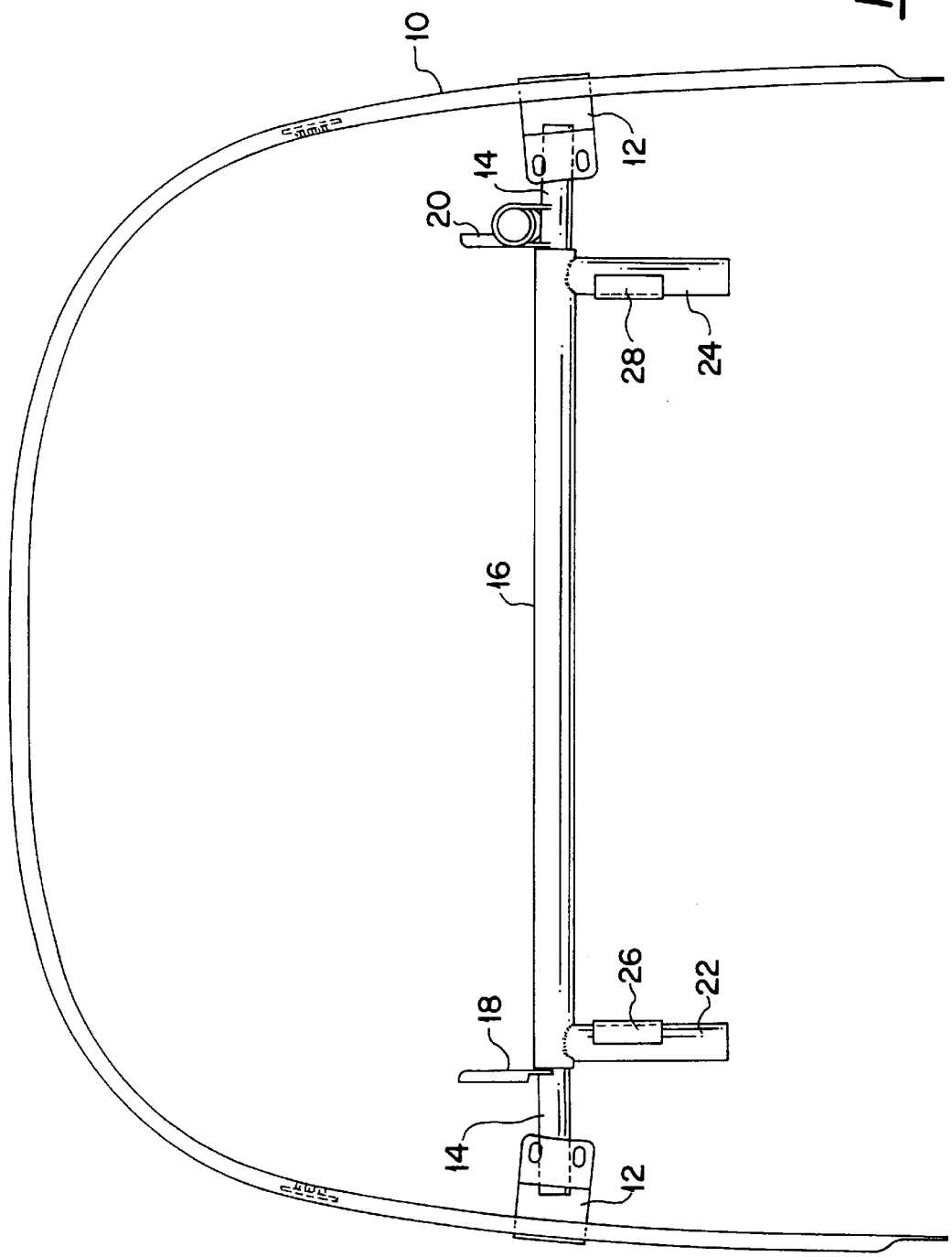
FIG. 1 is a top plan view of a frame for supporting a grass collector.
Figure 2:
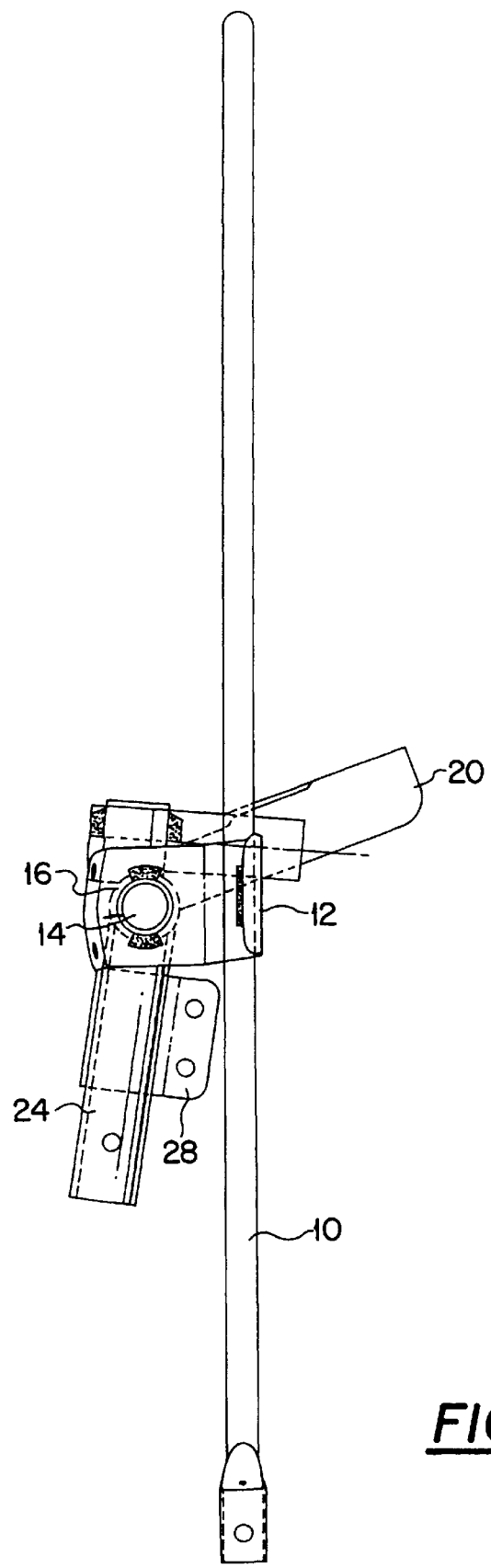
FIG. 2 is a side elevational view thereof.

Referring first to FIGS. 1 and 2, a substantially semi-circular frame member 10 is provided for supporting the upper edge of a conventional bag used for collecting clippings from a rear discharge rotary lawnmower. For convenience of illustration, the bag itself is not shown. It will be understood, however, that such a bag customarily is also secured at its forward edge to a substantially U-shaped front frame member which projects downwardly from the ends of frame 10, the front frame lying in a plane disposed at an approximate angle of 90° with respect to the plane of the upper frame 10. Thus, when the front frame is positioned against the backplate of a rear discharge mower, the bag is oriented so as to collect clippings exiting the mower.

A pair of brackets 12 are secured to frame 10 at equal distances from each free end of the frame. Opposite ends of a rod 14 are secured in non-movable position to the brackets. Rod 14 is received within a tubular member 16 positioned intermediate the ends of the rod. The inner diameter of member 16 and the outer diameter of rod 14 are such that the rod, and frame 10 attached thereto, are pivotally movable relative to member 16.

Tubular member 16 is positioned on rod 14 by brackets 18 and 20 fixed to the rod at opposite ends of member 16. As will be explained hereinafter, brackets 18 and 20 are also utilized as supports to which ends of torsion springs are attached.

A pair of projecting posts 22 and 24 are fixed to the tubular member 16 adjacent its ends. The axes of the posts lie in a common plane. Additional brackets 26 and 28 are secured to the respective posts. Brackets 26 and 28 serve as additional supports for the torsion springs which hereinafter will be described.

Figure 3A:
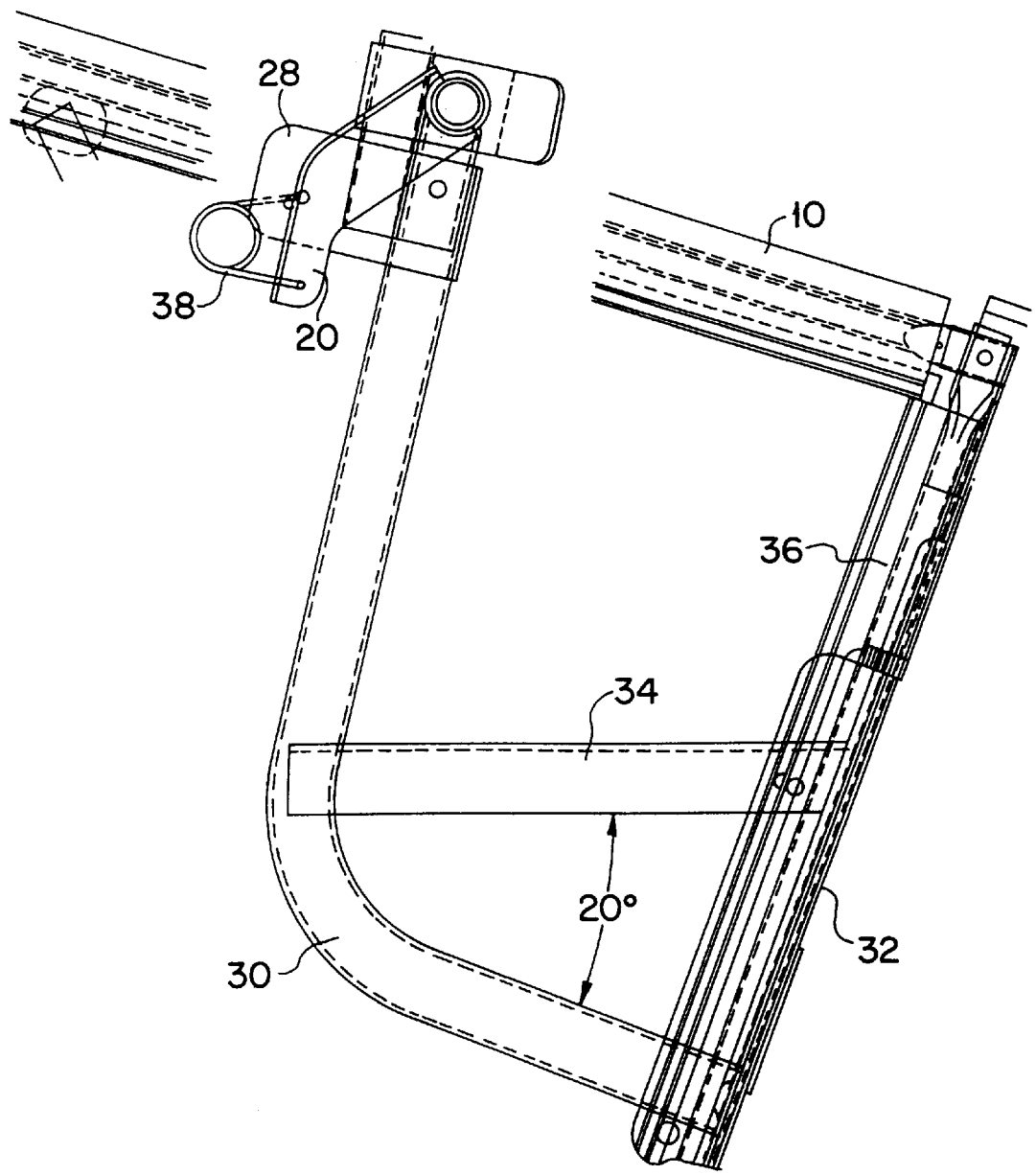
FIG. 3A is a fragmented side elevational view of the grass collector frame in a closed position relative to the mower.

FIG. 3A illustrates the manner in which the grass collector is joined to the rear discharge mower. More particularly, a pair of curved tubular support members 30 are secured to the backplate 32 of the mower. The members 30 lie in spaced parallel planes, the distance between them corresponding to the spacing between posts 22 and 24. For convenience of illustration, the view presented in FIG. 3A is taken from between the support members 30 so that only one such member is visible. Consequently, post 22 and brackets 18 and 26 also are not visible in FIG. 3A.

Each support member 30 has an initial portion projecting rearwardly from backplate 32. The members then curve upwardly towards their free ends.

The inner diameters of members 30 are slightly greater than the outer diameters of posts 22 and 24. Consequently, the grass collector can be attached to the mower by slipping the ends of the posts into the free ends of the respective members 30. To support the weight of the collector and its contents, each member 30 is reinforced by a brace 34 joined between the member and backplate 32.

In the view shown in FIG. 3A, the grass collector is illustrated in the closed position with the free ends of upper frame 10 and a front U-shaped frame 36 of the collector in contact with the mower's backplate 32. It will be appreciated, however, that without any type of connection between brackets 18 and 26 and between brackets 20 and 28, the collector would be freely pivotally movable about the axis of member 16 whereby the collector would swing between open and closed positions.

So as to maintain the collector in either a closed or an open position, a first torsion spring 38 is connected between brackets 20 and 28. A second torsion spring (not visible in FIG. 3A) is connected between brackets 18 and 26.

Figure 4A:
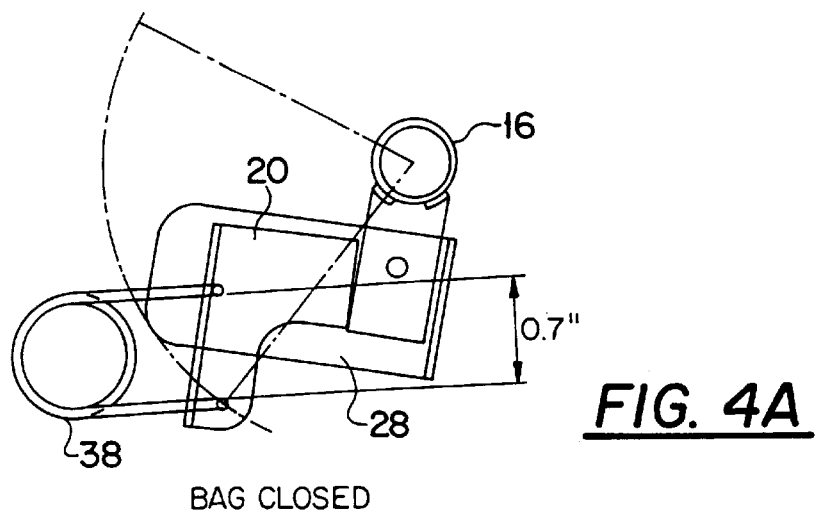
FIGS. 4A–4C illustrate a spring for maintaining the collector in an open or closed position relative to the mower.
Figure 4B:
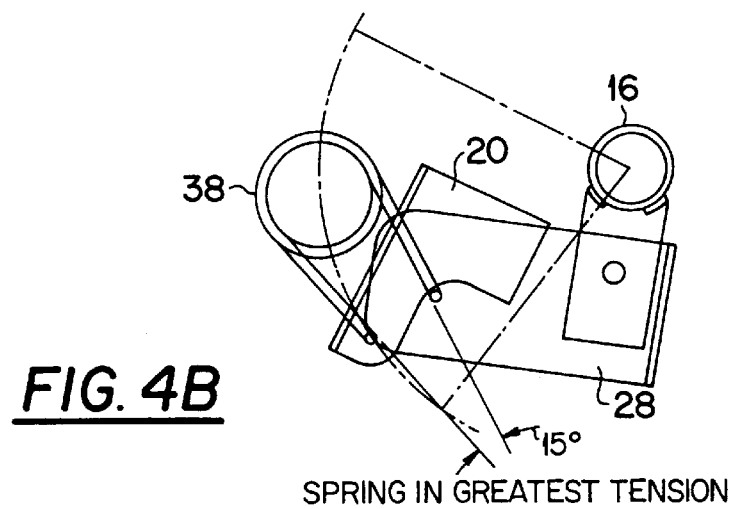
Figure 4C:
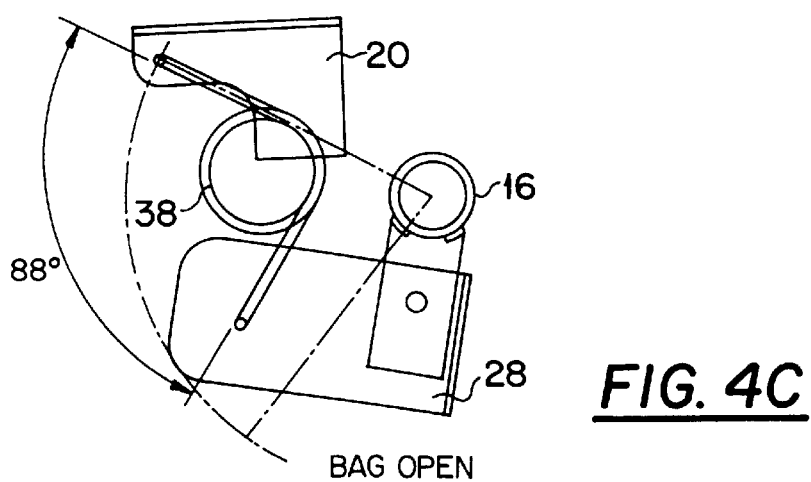

The manner in which the torsion springs operate to maintain the collector in open or closed position can be appreciated from FIGS. 4A–4C.

Brackets 20 and 28 (as well as brackets 18 and 26) are provided with apertures to receive the ends of the respective torsion springs. The apertures are so positioned that when the collector is in the closed position (FIG. 4A), the springs urge brackets 18 and 20, and thus rod 14 to which the brackets are fixed, to rotate about the axis of member 16 in a counterclockwise direction (as viewed in FIG. 4A). This spring force maintains the collector in a closed position.

Bracket 20 is configured to include a gripping surface. When the operator grasps bracket 20 and moves it in a direction to cause clockwise rotation of bracket about the axis of member 16, the spacing between the ends of the respective springs 38 is narrowed, and energy is stored. At a point where continued displacement of bracket 20 results in the ends of the springs attached to the movable brackets being in over-center positions, energy stored in the springs is released and the collector moves to, and is retained in, an open position. Reversing the operation just described causes the collector to be returned to the closed position.

By selectively displacing bracket 20 in counterclockwise or clockwise directions, the mower operator can position the collector in a closed position to receive clippings or in an open position to dump them.

Figure 3B:
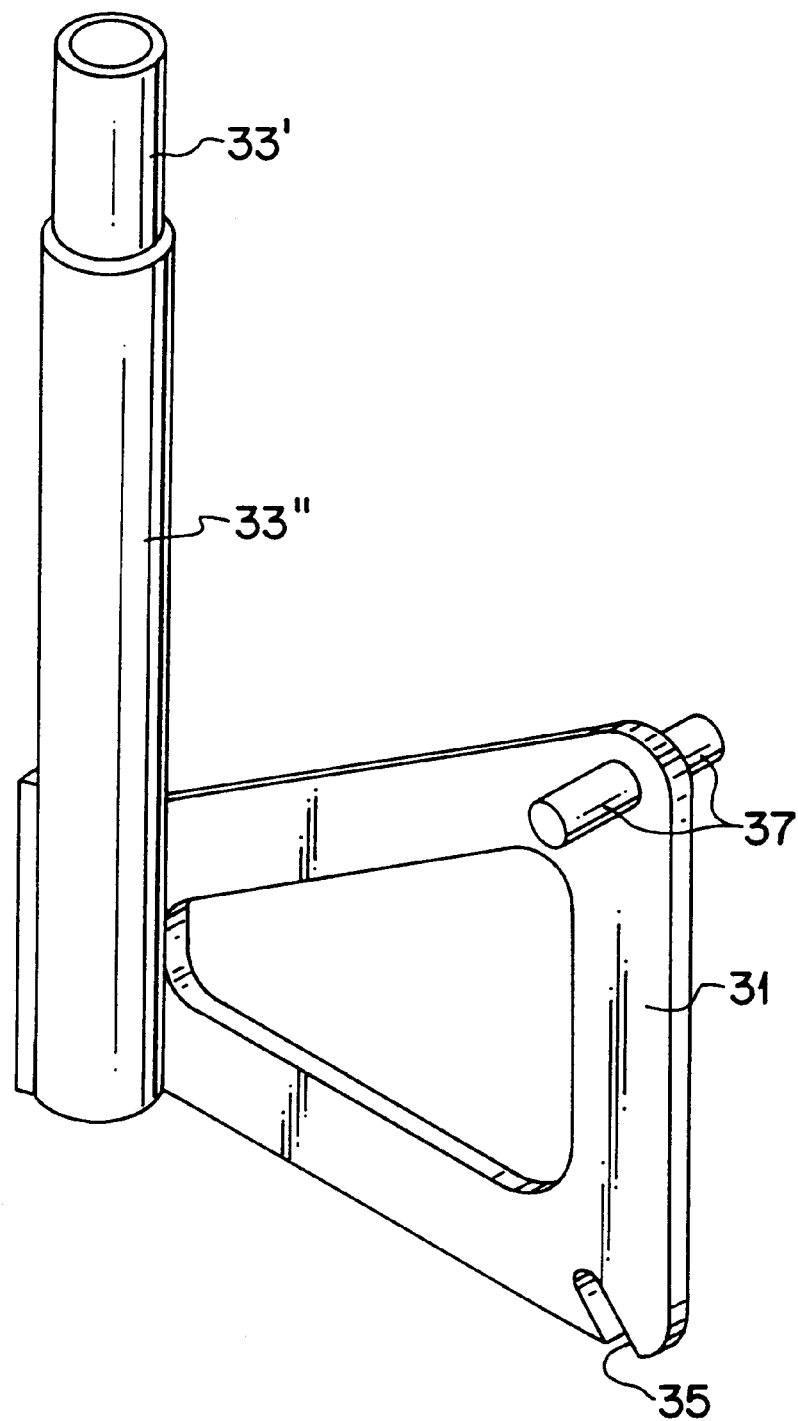
FIG. 3B is a perspective view of an alternative embodiment of the grass collector support member shown in FIG. 3A.

In the arrangement described with respect to FIG. 3A, the support members 30 and braces 34 have been described as being secured to the mower's backplate 32 in fixed positions. However, an arrangement is illustrated in FIG. 3B which is a support both pivotally and removably joined to the backplate. More particularly, FIG. 3B depicts a support member which can be substituted for each pair of support member 30 and brace 34 shown in FIG. 3A. The support member of FIG. 3B comprises a substantially triangular shaped bracket 31 which, at one end thereof, is secured to the lower end portion of a vertically extending tube having an upper end portion 33' of lesser diameter than the lower end portion 33". The outer diameter of portion 33' is less than the inner diameter of posts 22 and 24 whereby the posts can be slipped over respective portions 33' of the support members so as to rest on the shoulders formed where portions 33' and 33" meet. Bracket 31, at the lower portion of its opposite end, is provided with a notch 35 in order to permit the bracket to be slipped over backplate supports (not shown) of the type which permit pivotal movement of bracket 31 relative thereto. Projecting lugs 37 are provided at the upper portion of the bracket's opposite end to permit the bracket to be retained against the backplate by suitable backplate securing means (not shown) releasably engaging the lugs 37. For example, spring loaded latches could be employed on the backplate to hold the lugs. For pivoting or removing the brackets 31, the latches are actuated to release the lugs. The brackets can then be pivoted relative to the backplate—with or without the collector still secured to the brackets—, or the brackets can be separated from the mower entirely.

What is claimed is:

1. A grass collector arrangement for a mower having a discharge port provided at a rear portion of a mower housing, said arrangement including:
   a pair of spaced support members each secured to the housing and having a first portion extending rearwardly from the housing to a distal location spaced from said rear portion of the housing and a second portion extending upwardly from said distal location;
   a frame member to which an upper edge of a grass collector is secured, said frame member being pivotally connected to upper ends of said second portions of the support members at respective locations substantially equally spaced from free ends of the frame member to permit the collector to move between a first position at which the collector is positioned adjacent said port to receive grass clippings discharged from the mower housing through said port and a second position at which the collector is displaced from said port allowing clippings to be dumped from the collector; and
   a spring arrangement operatively associated with said frame member for providing a retention force to maintain the collector in one of said first or second positions until the force is overridden so as to permit the collector to move to the other of said positions.

2. A grass collector arrangement according to claim 1, further comprising:
   a tubular member secured to said upper ends of said second portions of the support members rearwardly of the housing, said frame member being pivotally supported by the tubular member so as to be pivotable about a longitudinal axis of the tubular member.

3. A grass collector arrangement according to claim 2, wherein said frame member is a substantially U-shaped member, said arrangement further comprising:
   a rod secured at its opposite ends to said frame member at said locations substantially equally spaced from the free ends of the U-shaped frame member, said rod being received within the tubular member to permit the frame member to pivot about the longitudinal axis of the tubular member.

4. A grass collector arrangement according to claim 3, wherein said spring arrangement includes at least one spring connected between said tubular member and said rod.

5. A grass collector arrangement according to claim 3, wherein said rod is retained against movement along the longitudinal axis of the tubular member by brackets joined to the rod adjacent opposite ends of the tubular member.

6. A grass collector arrangement according to claim 5, wherein said spring arrangement includes at least one spring connected between said tubular member and one of said brackets.

7. A grass collector arrangement according to claim 4, wherein said spring has ends movable relative to one another so as to pass an over-center position, said spring exerting force in one direction when the spring ends are on one side of the over-center position and exerting force in an opposite direction when the spring is on the other side of the over-center position.

8. A grass collector arrangement according to claim 2, wherein said tubular member is removably secured to the second portion of said support members to permit the frame member and grass collector to be detached from the support members.

9. A grass collector arrangement for a mower having a discharge port provided at a rear portion of a mower housing, said arrangement including:
   a pair of spaced support members each secured to the housing and having a first portion extending rearwardly from the housing to a distal location spaced from said rear portion of the housing and a second portion extending upwardly from said distal location;
   a tubular member secured to upper ends of said second portions of the support members rearwardly of the housing;
   a substantially U-shaped frame member to which an upper edge of a grass collector is secured;
   a rod secured at its opposite ends to said frame member at locations substantially equally spaced from free ends of the U-shaped frame member, said rod being received within the tubular member to permit the frame member to pivot about a longitudinal axis of the tubular member thereby permitting the collector to move between a first position at which the collector is positioned adjacent said port to receive grass clippings discharged from the mower housing through said port and a second position at which the collector is displaced from said port allowing clippings to be dumped from the collector; and a spring arrangement for providing a retention force to maintain the collector in one of said first or second positions until the force is overridden so as to permit the collector to move to the other of said positions, said spring arrangement including at least one spring connected between said tubular member and said rod.

10. A grass collector arrangement according to claim 9, wherein said rod is retained against movement along the longitudinal axis of the tubular member by brackets joined to the rod adjacent opposite ends of the tubular member.

11. A grass collector arrangement according to claim 10, wherein said at least one spring is connected between said tubular member and one of said brackets.

12. A grass collector arrangement according to claim 9, wherein said spring has ends movable relative to one another so as to pass an over-center position, said spring exerting force in one direction when the spring ends are on one side of the over-center position and exerting force in an opposite direction when the spring is on the other side of the over-center position.

13. A grass collector arrangement according to claim 12, wherein said rod is retained against movement along the longitudinal axis of the tubular member by brackets joined to the rod adjacent opposite ends of the tubular member and wherein said spring ends are respectively connected to said tubular member and one of said brackets.

14. A grass collector arrangement according to claim 9, wherein said tubular member is removably secured to said second portions of the support members to permit the frame member and grass collector to be detached from the support members.

15. A grass collector arrangement according to claim 13, wherein said tubular member is removably secured to said second portions of the support members to permit the frame member and grass collector to be detached from the support members.

* * * * *